(12) United States Patent
de la Cruz

(10) Patent No.: US 12,023,593 B2
(45) Date of Patent: *Jul. 2, 2024

(54) SYSTEM AND METHOD OF GENERATING AND PROVIDING INTERACTIVE ANNOTATION ITEMS BASED ON TRIGGERING EVENTS IN A VIDEO GAME

(71) Applicant: Activision Publishing, Inc., Santa Monica, CA (US)

(72) Inventor: Allen Joseph de la Cruz, Brooklyn, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,823

(22) Filed: Aug. 5, 2022

(65) Prior Publication Data

US 2023/0027385 A1    Jan. 26, 2023

Related U.S. Application Data

(63) Continuation of application No. 16/261,844, filed on Jan. 30, 2019, now Pat. No. 11,439,909, which is a continuation of application No. 15/136,386, filed on Apr. 22, 2016, now Pat. No. 10,226,703.

(60) Provisional application No. 62/317,303, filed on Apr. 1, 2016.

(51) Int. Cl.
*A63F 9/24* (2006.01)
*A63F 13/537* (2014.01)
(Continued)

(52) U.S. Cl.
CPC ............ *A63F 13/67* (2014.09); *A63F 13/537* (2014.09); *A63F 13/5375* (2014.09);
(Continued)

(58) Field of Classification Search
CPC ........ A63F 13/63; A63F 13/69; A63F 13/822; A63F 2300/535; A63F 2300/552;
(Continued)

(56) References Cited

U.S. PATENT DOCUMENTS

| 5,031,089 A | 7/1991 | Liu |
| 5,442,569 A | 8/1995 | Osano |

(Continued)

FOREIGN PATENT DOCUMENTS

| AU | 768367 | 3/2004 |
| AU | 2005215048 | 10/2011 |

(Continued)

OTHER PUBLICATIONS

Ma et al., "A Scalable Parallel Cell-Projection Volume Rendering Algorithm for Three-Dimensional Unstructured Data", IEEE 1997, pp. 1-10.

(Continued)

*Primary Examiner* — Michael A Cuff
(74) *Attorney, Agent, or Firm* — Novel IP

(57) ABSTRACT

A system and method is provided that automatically annotates gameplay based on triggering events that occur during a gameplay session. The system may automatically annotate the gameplay in real-time, such as during a gameplay session associated with an electronic-sports tournament. For example, the system may obtain and parse a game log corresponding to the gameplay session, identify triggering events based on the game log, obtain an annotation rule associated with the triggering event, generate an annotation item based on the annotation rule, and cause the annotation item to be presented in association with video of the gameplay session. An annotation item may be displayed interactively such that, when selected, causes the system to take an action. The action may include obtaining additional information relating to the selected annotation item; saving, sharing, liking/disliking or commenting on the selected annotation item; removing the selected annotation item from a display, and/or other actions.

30 Claims, 6 Drawing Sheets

(51) Int. Cl.
 *A63F 13/5375* (2014.01)
 *A63F 13/63* (2014.01)
 *A63F 13/67* (2014.01)
 *A63F 13/795* (2014.01)
 *A63F 13/86* (2014.01)

(52) U.S. Cl.
 CPC ............ *A63F 13/63* (2014.09); *A63F 13/795* (2014.09); *A63F 13/86* (2014.09)

(58) Field of Classification Search
 CPC ............ A63F 2300/554; A63F 2300/57; A63F 2300/60; A63F 2300/807
 USPC .......................................................... 463/43
 See application file for complete search history.

(56) References Cited

U.S. PATENT DOCUMENTS

| | | |
|---|---|---|
| 5,530,796 A | 6/1996 | Wang |
| 5,535,276 A | 7/1996 | Ganesan |
| 5,539,883 A | 7/1996 | Allon |
| 5,561,736 A | 10/1996 | Moore |
| 5,563,946 A | 10/1996 | Cooper |
| 5,630,129 A | 5/1997 | Wheat |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,736,990 A | 4/1998 | Barrus |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,774,668 A | 6/1998 | Choquier |
| 5,796,393 A | 8/1998 | MacNaughton |
| 5,825,877 A | 10/1998 | Dan |
| 5,835,692 A | 11/1998 | Cragun |
| 5,860,137 A | 1/1999 | Raz |
| 5,875,296 A | 2/1999 | Shi |
| 5,878,233 A | 3/1999 | Schloss |
| 5,883,628 A | 3/1999 | Mullaly |
| 5,884,024 A | 3/1999 | Lim |
| 5,900,879 A | 5/1999 | Berry |
| 5,903,266 A | 5/1999 | Berstis |
| 5,903,271 A | 5/1999 | Bardon |
| 5,908,469 A | 6/1999 | Botz |
| 5,911,045 A | 6/1999 | Leyba |
| 5,920,325 A | 7/1999 | Morgan |
| 5,923,324 A | 7/1999 | Berry |
| 5,938,722 A | 8/1999 | Johnson |
| 5,944,824 A | 8/1999 | He |
| 5,963,915 A | 10/1999 | Kirsch |
| 5,969,724 A | 10/1999 | Berry |
| 5,977,979 A | 11/1999 | Clough |
| 5,990,888 A | 11/1999 | Blades |
| 6,008,848 A | 12/1999 | Tiwari |
| 6,009,455 A | 12/1999 | Doyle |
| 6,014,145 A | 1/2000 | Bardon |
| 6,021,268 A | 2/2000 | Johnson |
| 6,025,839 A | 2/2000 | Schell |
| 6,049,819 A | 4/2000 | Buckle |
| 6,058,266 A | 5/2000 | Megiddo |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,088,727 A | 7/2000 | Hosokawa |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,134,588 A | 10/2000 | Guenthner |
| 6,141,699 A | 10/2000 | Luzzi |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,141 B1 | 12/2001 | Varma |
| 6,336,134 B1 | 1/2002 | Varma |
| 6,337,700 B1 | 1/2002 | Kinoe |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,370,560 B1 | 4/2002 | Robertazzi |
| 6,393,467 B1 | 5/2002 | Potvin |
| 6,411,312 B1 | 6/2002 | Sheppard |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,597 B1 | 10/2002 | Johnson |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,601,084 B1 | 7/2003 | Bhaskaran |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,699,127 B1 | 3/2004 | Lobb |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,801,930 B1 | 10/2004 | Dionne |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,089,266 B2 | 8/2006 | Stolte |
| 7,124,071 B2 | 10/2006 | Rich |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |

(56) References Cited

U.S. PATENT DOCUMENTS

| | | |
|---|---|---|
| 7,305,438 B2 | 12/2007 | Christensen |
| 7,308,476 B2 | 12/2007 | Mannaru |
| 7,353,295 B1 | 4/2008 | Crow |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,548,948 B2 | 6/2009 | Klemets |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |

(56) References Cited

U.S. PATENT DOCUMENTS

| | | |
|---|---|---|
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | Bruce |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,550,920 B1 | 10/2013 | Allen |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,856,650 B1 | 10/2014 | Off |
| 8,893,012 B1 | 11/2014 | Zhang |
| 8,911,296 B2 | 12/2014 | Chudley |
| 8,992,316 B2 | 3/2015 | Smith |
| 9,005,030 B2 | 4/2015 | Laakkonen |
| 9,005,036 B2 | 4/2015 | Laakkonen |
| 9,083,654 B2 | 7/2015 | Dawson |
| 9,152,914 B2 | 10/2015 | Haggar |
| 9,199,165 B2 | 12/2015 | Zahn |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,403,090 B2 | 8/2016 | Harris |
| 9,474,973 B2 | 10/2016 | Perry |
| 9,525,746 B2 | 12/2016 | Bates |
| 9,583,109 B2 | 2/2017 | Kurata |
| 9,621,622 B2 | 4/2017 | Ueda |
| 9,630,097 B2 | 4/2017 | Paradise |
| 9,641,592 B2 | 5/2017 | Thompson |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 10,223,449 B2 | 3/2019 | Smith |
| 2002/0007317 A1 | 1/2002 | Callaghan |
| 2002/0010776 A1 | 1/2002 | Lerner |
| 2002/0023159 A1 | 2/2002 | Vange |
| 2002/0056006 A1 | 5/2002 | Vange |
| 2002/0065870 A1 | 5/2002 | Baehr-Jones |
| 2002/0078192 A1 | 6/2002 | Kopsell |
| 2002/0107918 A1 | 8/2002 | Shaffer |
| 2002/0124137 A1 | 9/2002 | Ulrich |
| 2003/0008712 A1 | 1/2003 | Poulin |
| 2003/0037131 A1 | 2/2003 | Verma |
| 2003/0055892 A1 | 3/2003 | Huitema |
| 2003/0056002 A1 | 3/2003 | Trethewey |
| 2003/0084172 A1 | 5/2003 | DeJong |
| 2003/0084302 A1 | 5/2003 | De |
| 2003/0110399 A1 | 6/2003 | Rail |
| 2003/0135621 A1 | 7/2003 | Romagnoli |
| 2003/0149781 A1 | 8/2003 | Yared |
| 2003/0163733 A1 | 8/2003 | Barriga-Caceres |
| 2003/0177187 A1 | 9/2003 | Levine |
| 2004/0014514 A1 | 1/2004 | Yacenda |
| 2004/0073773 A1 | 4/2004 | Demjanenko |
| 2004/0103079 A1 | 5/2004 | Tokusho |
| 2004/0210627 A1 | 10/2004 | Kroening |
| 2004/0228291 A1 | 11/2004 | Huslak |
| 2004/0244006 A1 | 12/2004 | Kaufman |
| 2005/0015571 A1 | 1/2005 | Kaufman |
| 2005/0246711 A1 | 11/2005 | Berstis |
| 2006/0059223 A1 | 3/2006 | Klemets |
| 2007/0060359 A1 | 3/2007 | Smith |
| 2007/0294089 A1 | 12/2007 | Garbow |
| 2008/0046956 A1 | 2/2008 | Kulas |
| 2008/0086459 A1 | 4/2008 | Ryan |
| 2008/0139301 A1 | 6/2008 | Holthe |
| 2008/0270605 A1 | 10/2008 | Berstis |
| 2008/0301405 A1 | 12/2008 | Kaufman |
| 2009/0082095 A1 | 3/2009 | Walker |
| 2009/0113448 A1 | 4/2009 | Smith |
| 2009/0131177 A1 | 5/2009 | Pearce |
| 2009/0147010 A1 | 6/2009 | Russell |
| 2009/0258708 A1 | 10/2009 | Figueroa |
| 2009/0298585 A1 | 12/2009 | Cannon |
| 2010/0153653 A1 | 6/2010 | El-Mahdy |
| 2010/0167816 A1 | 7/2010 | Perlman |
| 2011/0151971 A1 | 6/2011 | Altshuler |
| 2012/0100910 A1 | 4/2012 | Eichorn |
| 2012/0289346 A1 | 11/2012 | Van Luchene |
| 2014/0019862 A1* | 1/2014 | Fink .......... H04N 21/4781 715/719 |
| 2014/0031121 A1 | 1/2014 | Kern |
| 2014/0194211 A1 | 7/2014 | Chimes |
| 2014/0221084 A1 | 8/2014 | Morrison, III |
| 2014/0235336 A1 | 8/2014 | Morimoto |
| 2014/0344725 A1 | 11/2014 | Bates |
| 2014/0370979 A1 | 12/2014 | Zahn |
| 2015/0141140 A1 | 5/2015 | Lampe |
| 2015/0224395 A1 | 8/2015 | Trombetta |
| 2015/0224399 A1 | 8/2015 | Melo |
| 2015/0317945 A1 | 11/2015 | Andress |
| 2015/0375102 A1 | 12/2015 | George |
| 2015/0379407 A1 | 12/2015 | Woon |
| 2016/0140637 A1 | 5/2016 | Szabo |
| 2016/0171835 A1 | 6/2016 | Washington |
| 2016/0180647 A1 | 6/2016 | Webb |
| 2016/0191671 A1 | 6/2016 | Dawson |
| 2016/0214012 A1 | 7/2016 | Nishikawa |
| 2017/0014718 A1 | 1/2017 | Ceraldi |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0940960 A1 | 9/1999 |
| EP | 0998091 A2 | 5/2000 |
| EP | 1020804 A2 | 7/2000 |
| EP | 0627728 B1 | 9/2000 |
| EP | 1089516 A2 | 4/2001 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H1198134 A | 4/1999 |

(56) References Cited

FOREIGN PATENT DOCUMENTS

| | | |
|---|---:|---:|
| JP | H11191097 A | 4/1999 |
| JP | 11191097 | 7/1999 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 9642041 A2 | 12/1996 |
| WO | 9900960 A1 | 1/1999 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Hassen et al., "A Task-and Data-Parallel Programming Language Based on Shared Objects," ACM Transactions on Programming Languages and Systems, vol. 20, No. 6, Nov. 1998, pp. 1131-1170.

Kormann et al., "Risks of the Passport Single Signon Protocol"< 9th Intl. WWW Conf., May 15, 2000.

Syverson, "Limitations on design principles for public key protocols", Proc. of 1996 IEEE Symposium on Security and Privacy, pp. 62-72, May 6, 1996.

Abadi et al., "Prudent Engineering Practice for Cryptogrphic Protocols", Proc. of 1994 IEEE Computer Society Symposium on Research in Security and Privacy, pp. 122-136, May 16, 1994.

EverQuest Wiki, "EverQuest Classes", Aug. 19, 2011, <http://everquest.wikia.com/wiki/Classes?oldid=3773>.

Planet Unreal, "Unreal Tournament Game Guide", game released Nov. 1999 with earliest article cmment on Sep. 6, 2007, IGN Entertainment, <http://planetunreal.gamespy.com/View.php?view=UTGameInfo.Detail&id=28&game=6><http://planetunreal.gamespy.com/View.php?view=UTGameInfo.Detail&id=1&game=6>.

IBM developer Works, OptimalGrid—autonomic computing on the Grid, James H. Kaufman; Tobin J. Lehman; Glenn Deen; and John Thomas, Jun. 2003.

IBM, Transcoding: Extending e-business to new environments, Britton et al., Sep. 22, 2000.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.

Lee et al., "A Self-Adjusting Data Distribution Mechanism for Multidimensional Load Balancing in Multiprocessor-Based Database Systems," Information Systems vol. 19, No. 7, pp. 549-567, 1994.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

Andert, "A Simulation of Dynamic Task Allocation in a Distributed Computer System," Proceedings of the 1987 Winter Simulation Conference, 1987, pp. 1-9.

Derek Stanley, "What bitrate should I use when encoding my video? How do I optimize my video for the web?", Feb. 12, 2012, ezs3.com, <https://web.archive.Org/web/20120212171320/https://www.ezs3.com/public/What_bitrate_should_1_use_when_encoding_my_video_How_do_I_optimize_my_video_for the_web.cfm>(Year: 2012).

International Search Report as Published as WO2005/079538 in corresponding international application No. PCT/US2005/005550. dated Jul. 5, 2006.

Surelya, "CS:Go Winter Update Adds Killer Replay", MMOs.com, published Dec. 13, 2015 retrieved from Internet URL <https://mmos.com/news/csgo-winter-update-adds-killer-replay>. (Year: 2015).

* cited by examiner

SYSTEM AND METHOD OF GENERATING AND PROVIDING INTERACTIVE ANNOTATION ITEMS BASED ON TRIGGERING EVENTS IN A VIDEO GAME

CROSS-REFERENCE TO RELATED APPLICATIONS

This application is a continuation application of U.S. patent application Ser. No. 16/261,844, entitled "Systems and Methods of Generating and Sharing Social Messages Based on Triggering Events in a Video Game" and filed on Jan. 30, 2019, which is a continuation application of U.S. patent application Ser. No. 15/136,386, entitled "System and Method of Generating and Providing Interactive Annotation Items Based on Triggering Events in a Video Game", filed on Apr. 22, 2016, and issued as U.S. Pat. No. 10,226,703 on Mar. 12, 2019, which, in turn, claims priority to U.S. Provisional Patent Application Ser. No. 62/317,303, entitled "System and Method of Automatically Annotating Gameplay of a Video Game Based on Triggering Events" and filed Apr. 1, 2016, the contents of all of which are hereby incorporated by reference herein in their entirety.

FIELD OF THE INVENTION

The invention relates to a system and method of automatically annotating gameplay of a video game based on triggering events, and providing the automatically generated annotations with a broadcast of the gameplay.

BACKGROUND OF THE INVENTION

Electronic sports ("e-sports"), also known as competitive video gaming, has grown in popularity due in large part to the explosive growth of online video games and availability of network connectivity. Along with the popularity of e-sports, demand for live streaming or pre-stored replays of video gameplay sessions has grown. Although network technology has advanced in recent years to accommodate large scale data storage and transferring, the load on storage and network infrastructure imposed by live streaming and pre-stored playback of video gameplay sessions can be quite large, potentially causing delays and dissatisfaction for end users and maintenance problems for system administrators. This is because conventional methods of providing such playback typically involves recording gameplay as media files. These media files become very large, thanks in large part to modern high definition, graphics-intense, video games. Furthermore, due to the fast-paced nature of many of these competitive video gaming events and gameplay sessions, it is often difficult to obtain relevant information relating to in-game events and historical statistics.

These and other problems exist with annotating and sharing video game playback.

SUMMARY OF THE INVENTION

The invention addressing these and other drawbacks relates to a system and method of automatically annotating gameplay based on triggering events that occur during a gameplay session. The system may automatically annotate the gameplay in real-time, such as during a gameplay session associated with an electronic-sports tournament. For example, the system may obtain and parse a game log corresponding to the gameplay session, identify triggering events based on the game log, obtain an annotation rule associated with the triggering event, generate an annotation item based on the annotation rule, and cause the annotation item to be presented in association with video of the gameplay session.

An automatically generated annotation item may be displayed interactively such that, when selected, causes the system to take an action. The action may include obtaining additional information relating to the selected annotation item; saving, sharing, liking/disliking or commenting on the selected annotation item; removing the selected annotation item from a display, and/or other actions.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of automatically annotating gameplay of a video game based on triggering events. While aspects (including examples) of the invention may be described herein with reference to particular types of video game genres, the system and method described in detail herein may be used in any genre of single or multiplayer video game.

Exemplary System Architecture

Figure 1:
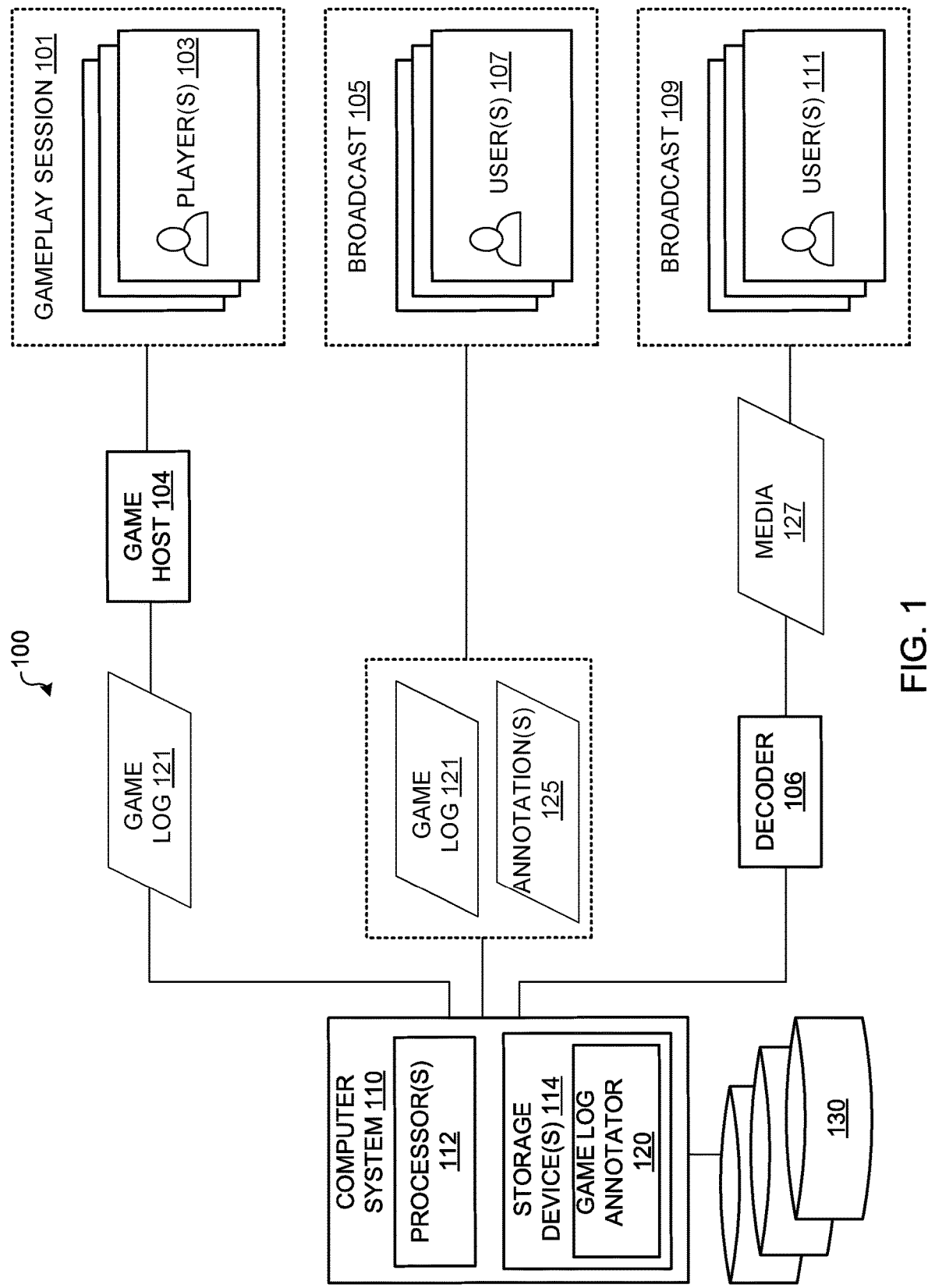
FIG. 1 illustrates a system of automatically annotating gameplay of a video game based on triggering events, according to an implementation of the invention.

FIG. 1 illustrates a system 100 of automatically annotating gameplay of a video game based on triggering events, according to an implementation of the invention. As used herein, the term "automatically" (e.g., automatically annotating gameplay of a video game) denotes that a computer system is programmed to annotate gameplay without human intervention based on logic that programs the computer system, one or more rules, and/or other information the computer system may use to generate annotations without human intervention. Such terminology, however, does not preclude the intervention by a human to either modify the automatically generated annotations, delete (or otherwise prevent the dissemination of) the automatically generated annotations, provide information used by the computer system 110 to automatically generate the annotations, or otherwise interact with the annotations after they have been automatically generated annotations.

In one implementation, system 100 may include a game host 104, a decoder 106, a computer system 110, one or more databases 130, and/or other components.

Game Logs

In an implementation, game host 104 may host a gameplay session 101 between one or more players 103 and generate a game log 121 based on gameplay during gameplay session 101. A game log, which may be generated by a game engine (e.g., executing at game host 104), describes gameplay during a given gameplay session such that events occurring during the video game session may be recreated. In a sense, a game log may be thought of as a recording of events that occurred during gameplay, even though a game log may not be a "video recording" per se in that the game log itself is not played back by a conventional media player (unless converted to a conventional media format as described herein). Instead, a game log may include information that indicates one or more game events that have occurred during gameplay. In an implementation, a game log may include information relating to player activity during gameplay such as the presence or absence of player chats via headsets, the amplitude/volume of such headset chat, texting/chatting in out-of-band streams, observed physical behavior of a player (e.g., a player standing, jumping, etc.) based on inputs from peripheral devices such as cameras, and/or other player activity information.

Accordingly, gameplay that occurred during a video game session may be replayed based on the game events (hereinafter, such replay based on a game log will be referred to as a "video game playback" even though a replay may occur substantially in real-time—e.g., as a gameplay session is occurring—or not in real-time—e.g., stored and later retrieved for later video game playback). Because a game log specifies game events that occurred during gameplay rather than a rendering of the gameplay, a given game log occupies a much smaller footprint than a conventional media file that would, for example, render video of the gameplay.

The game events may include, without limitation, a player's input, a game engine's response to a player's input, an interaction between a bot and another player (e.g., another human player or another bot), an interaction between virtual objects and other objects or players, and/or other event that can occur during gameplay. A game event may be recorded as information that encodes the event. For instance, a game event may be encoded as a generic event, such as "player input button A," or a specific event (e.g., specific to a particular game), such as "player defeated boss X." A computer readable mapping of events to encodings may be stored in a database as well, in which case a game log may simply include encodings that map to particular events.

A given game log may be associated with video game information such as, without limitation, a video game title, a video game genre related to the video game title, a publisher of the video game title, the names of player(s) involved in a video game session to which the game log relates, and/or other information relating to the video game or video game session to which the game log relates.

Game host 104 may generate the game log in real-time (e.g., as gameplay is happening) and may stream the game log as it is generated to one or more other devices for annotating gameplay and/or broadcasting the gameplay. For example, game host 104 may provide the game log to computer system 110 for automatic annotation of the gameplay. It should be noted, however, that the functions of computer system 110 may be incorporated within the game host (and vice versa). For example, game host 104 and computer system 110 may be housed within the same device or may cooperate together (e.g., they may each be server blades/processors that cooperatively work together).

Annotating Gameplay

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that is programmed to automatically annotate gameplay of a video game as described herein.

Computer system 110 may include one or more processors 112 (also interchangeably referred to herein as processors 112, processor(s) 112, or processor 112 for convenience), one or more storage devices 114 (which may store a gameplay annotator 120), and/or other components. Processors 112 may be programmed by one or more computer program instructions. For example, processors 112 may be programmed by gameplay annotator 120 and/or other instructions. Gameplay annotator 120 may include various instructions that program computer system 110. As described herein, gameplay annotator 120 will be described as programming computer system 110 to perform various operations. However, it should be understood that a portion (or all) of gameplay annotator 120 may, alternatively or additionally, program other system components (e.g., an end user device) to perform at least some of the functions of gameplay annotator 120.

Identifying Triggering Events

In an implementation, gameplay annotator 120 may parse (e.g., read), either in real-time or after gameplay session 101 has concluded, the game log. Whether real-time or not, such parsing may occur in intervals (as described below with respect to FIG. 2A) or continuously (as described below with respect to FIG. 2B). Regardless of the method by which parsing is performed, gameplay annotator 120 may identify one or more triggering events based on the parsing. For example, a triggering event may have occurred during gameplay and be specified in the game log, from which the triggering event is parsed and identified.

A triggering event may include an in-game event that may be of interest to an audience member (e.g., user 107, user 111) viewing the gameplay. For example, and without limitation, a triggering event may include the gameplay session has reached a particular game state (e.g., a start/end of a match, a change in location of action (e.g., combat moves from one area of the map to another), an injury to a particular player (e.g., in a basketball, football or sports simulation), a number or all players dying except one), an in-game achievement by one or more players (e.g., a first kill of a match, a first score, a score differential by certain threshold, a particular type of achievement has been reached (e.g., that's the 10th time a player has gotten a double kill this match or that's a player's 5th basketball assist to another player this video gameplay session)), and/or other event that may be of interest to a user.

Triggering events may be customized for a given game. Such customizations may be made by a game developer, a player 103, a user 107, a user 111, and/or others. Information specifying the triggering events and/or customizations may be stored in a triggering event repository, such as a database 130. For example, a triggering event may be stored as a triggering event identifier, and a triggering event type or description.

Generating Annotation Items Based on Annotation Rules Tied to Triggering Events

In an implementation, gameplay annotator 120 may obtain, responsive to identification of a triggering event, a corresponding set of one or more annotation rules relating to the triggering event. For example, an annotation rules database (e.g., a database 130) may store annotation rules in association with information identifying triggering events (e.g., a triggering event identifier). Alternatively or additionally, the annotation rules may be part of the logic of gameplay annotator 120. In either or both instances, each triggering event may be associated with (e.g., mapped to) one or more annotation rules that specifies how to handle the triggering event.

An annotation rule may relate to a game characteristic relating to the triggering event. For example, an annotation rule may relate to players/teams involved in a gameplay session, a time that the triggering event occurred in the game (e.g., if the trigger is one team killing all the members of the opposing team, the annotation item(s) that are generated may depend on whether the triggering event is detected at the in the first 3 minutes of the game, minutes 3-10, or after the 10 minute mark), a location (e.g., on a game map) at which the triggering event was detected, a number of times the triggering event was detected previously in the match, the events that were recorded the last time the triggering detected was detected, etc.).

A given annotation rule may specify that coarse (e.g., general) and/or more granular (e.g., specific) information be gathered and provided as an annotation item in response to a triggering event. Alternatively or additionally, two or more annotation rules may be associated with a triggering event. One of the annotation rules may specify that one piece of information be provided in response to the triggering event while another one of the annotation rules may specify that another piece of information be provided in response to the triggering event. The information for the annotation item(s) may be obtained from a pre-stored statistical/historical database of gameplay (e.g., a database 130) and/or may be gathered from the game log itself (e.g., in-game statistics for the current gameplay session such as number of kills, kill-to-death "k/d" ratio, number of pistol kills, success rate after entry, heads-up matches, etc.). As such, annotation items may relate to historical statistical data and/or current in-game data. In some embodiments, a description of the trigger event itself could be provided as the annotation item instead of or in addition to one or more pieces of information.

In one example, if a triggering event relates to a start of a match, an annotation rule may specify that a comparison between the match participants be made. Such annotation rule may be coarse (e.g., obtain the prior N meetings between the match participants and the corresponding records). Alternatively, the annotation rule may be more granular, such as specifying that a specific set of statistics of prior N meetings between the match participants be obtained. In some implementations, the foregoing rules (and/or other rules) may be combined into a single rule or be individually associated with the triggering event such that both coarse and granular information be obtained.

In an implementation, an annotation rule may specify that a game condition be taken into account when generating annotation items. For example, an annotation rule may specify that if only N number of players (e.g., one or two players) are alive after a predetermined time after the start of a gameplay session, an annotation item relating to the odds of survival/winning for each remaining player be generated based on the number of remaining players, the statistics (e.g., k/d ratios) of the other remaining players, etc. In another example, if a triggering event relates to a particular k/d ratio that has been achieved (e.g., a k/d ratio that exceeds a threshold value), then the annotation rule may specify that the k/d ratio be presented as an annotation item. It should be noted that an annotation item may relate to a single player, more than one player, or a collective team of players.

Providing Annotation Items and Updating the Set of Annotation Items

In an implementation, annotation item(s) may be presented as they are obtained responsive to triggering events. For example, as a triggering event occurs during a gameplay session, corresponding annotation item(s) may be obtained and presented to the audience. Such annotation items may be presented as a graphical user interface ("GUI") object (e.g., a moving ticker display, a stationary display, a separate window, etc.), a message (e.g., a social media message, an email, an Short Message Service text message, etc.), and/or other communication channel. An example GUI is described with respect to FIG. 4 below.

In implementations in which an annotation item is presented as a GUI object, the annotation item may be displayed persistently until a next annotation item is available (e.g., based on a new triggering event) to replace the annotation item. Alternatively or additionally, the annotation item may be displayed until a timer has expired. In this manner, an annotation item may be removed from the display when a certain time period has expired (or when a replacement item is available).

In an implementation, gameplay annotator 120 may store annotation items for a gameplay session in an annotation stack. The annotation stack may include all or a portion of annotation items generated for the gameplay session. Each annotation item may be associated with a timestamp. The timestamp may indicate a date/time that the annotation item was generated, a date/time that the corresponding triggering event (which triggered creation of the annotation item) occurred in the gameplay, and/or other date/time (the term "date/time" refers to date and/or time). In some instances, gameplay annotation 120 may select a top N annotation items to display any time a triggering event has occurred and cause the selected N annotation items to be presented. Such selection may be based on the date/time (e.g., only the most recent annotation items are presented).

In an implementation, the annotation items may be weighted using various annotation weights that signify an importance of the annotation item. The weights may include a time weight that causes more recent annotation items to be weighed more heavily that previous annotation items. An annotation item may be assigned with an annotation score based on the annotation weight. The top N annotation items having the highest scores may be selected for presentation at a given time (such as when a new triggering event and annotation item is detected and generated). In these implementations, the set of annotation items selected for presentation may or may not change after a triggering event has occurred.

In some instances, a triggering event may lead to an annotation item that replaces one of the top N annotation items (such replacement may, in some instances, include an annotation item that is effectively an update of another annotation item—such as when a current k/d ratio of a player "replaces" a previous k/d ratio of that same player).

Providing Annotations of Gameplay to Audiences

Annotation items and playback of gameplay session 101 (which may occur in real-time) may be facilitated in various ways. For example, gameplay annotation 120 may provide game log 121 along with automatically generated annotation items 125 to users 107, whose devices may include a decoder (not illustrated) that reads the game log and recreates video and/or audio of the gameplay based on the game log. The decoder may also read the annotation items 125 and present them as overlays or other graphical objects in association with the video and/or audio recreation. The decoder may also present the annotation items 125 as audio objects in association with the video and/or audio recreation (e.g., using a text to speech engine).

In other implementations, gameplay annotator 120 may provide, through a decoder (e.g., decoder 106), media 127 that includes the gameplay recreation overlaid with or otherwise incorporating the annotation items 125 to users 111. In some of these implementations, the gameplay session 101 may simply be live-streamed as media directly from game host 104, and gameplay annotator 120 may synchronize the annotation items 125 with the live-stream media. For example, game host 104 may output video and audio to users 111 (e.g., to a display viewed by users 111) and output the game log to gameplay annotator 120. In some of these implementations, latency may be injected into the live-stream media (e.g., introduce a delay or take advantage of commercial or other broadcast delays) so that gameplay annotator 120 has time to generate annotation items based on the game log. The gameplay recreation or live-stream media may comprise timestamps corresponding to timestamps in the game log and/or annotation items. The various timestamps can be used to synchronize the gameplay recreation or live-stream media with the annotation items 125 and/or game log.

In an implementation, the game log and annotation items automatically generated based on the game log may be stored as a metadata track for later retrieval and further annotation by users, as described in co-pending U.S. patent application Ser. No. 14/919,398, entitled "SYSTEM AND METHOD OF GENERATING AND DISTRIBUTING VIDEO GAME STREAMS," filed Oct. 21, 2015, which is incorporated by reference herein in its entirety.

Although illustrated in FIG. 1 as a single component, computer system 110 may include a plurality of individual components (e.g., computer devices) each programmed with at least some of the functions described herein. In this manner, some components of computer system 110 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

Databases 130

The various databases 130 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Figure 2A:
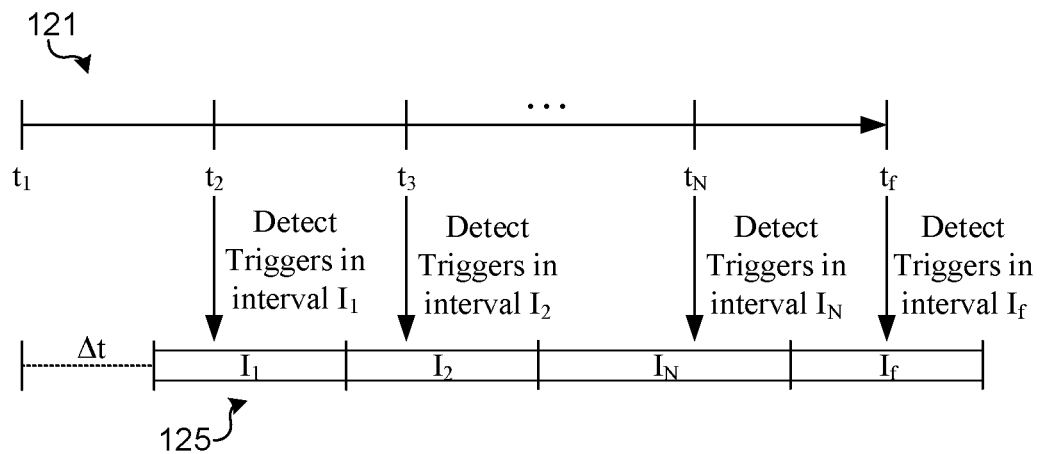
FIG. 2A depicts a schematic diagram illustration of processing intervals of a game log to annotate gameplay, according to an implementation of the invention.

FIG. 2A depicts a schematic diagram illustration of processing intervals of a game log to annotate gameplay, according to an implementation of the invention. In an implementation, gameplay annotator 120 may parse a game log at intervals ($I_1, I_2, \ldots, I_N$). Each interval may be defined by a predefined time period (e.g., five seconds) or a predetermined number of triggering events. For example, at the start ($t_1$) of a gameplay session, gameplay annotator 120 may start a timer to determine whether the predefined time period has expired and/or begin counting triggering events to determine whether the predetermined number of triggering events have occurred. During this time, there will be a latency ($\Delta t$) until the first interval $I_1$ is to be processed. When the interval defining occurrence has been reached, gameplay annotator 120 may identify triggering events (or process the counted triggers) and generate annotation items for that corresponding interval. For example, at time $t_2$, gameplay annotator 120 may generate annotation items for any event triggers that occurred during interval $I_1$. Gameplay annotator 120 may repeat this process for the remaining intervals. The foregoing may increase computational efficiency because the game log may be processed in more manageable chunks, while introducing minimal latency (or taking advantage of any broadcast latency).

Figure 2B:
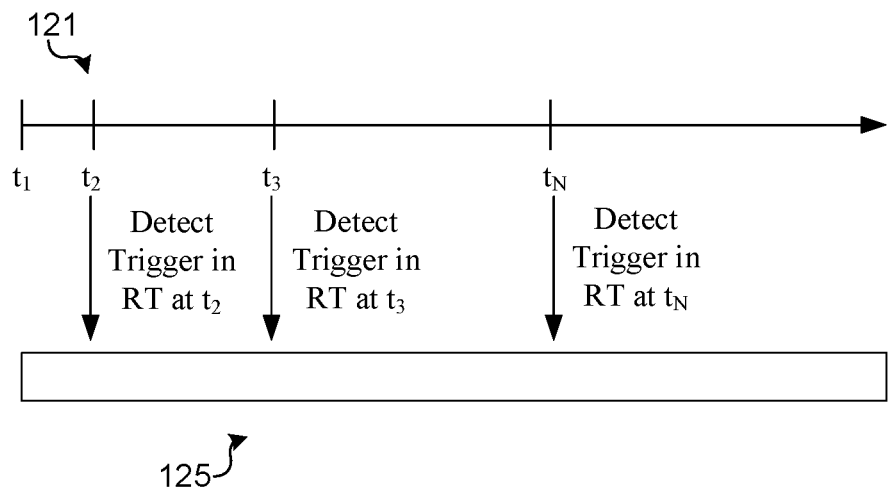
FIG. 2B depicts a schematic diagram illustration of continuous processing of a game log to annotate gameplay, according to an implementation of the invention.

FIG. 2B depicts a schematic diagram illustration of continuous processing of a game log to annotate gameplay, according to an implementation of the invention. In an implementation, gameplay annotator 120 may continuously parse a game log as it is received/read. For instance, each time a triggering event is detected (e.g., at $t_1, t_2, t_3, \ldots, t_N$) gameplay annotator 120 may process the triggering event (e.g., obtain a corresponding annotation rule, generate an annotation item based on the annotation rule, present the annotation item, etc.).

Figure 3:
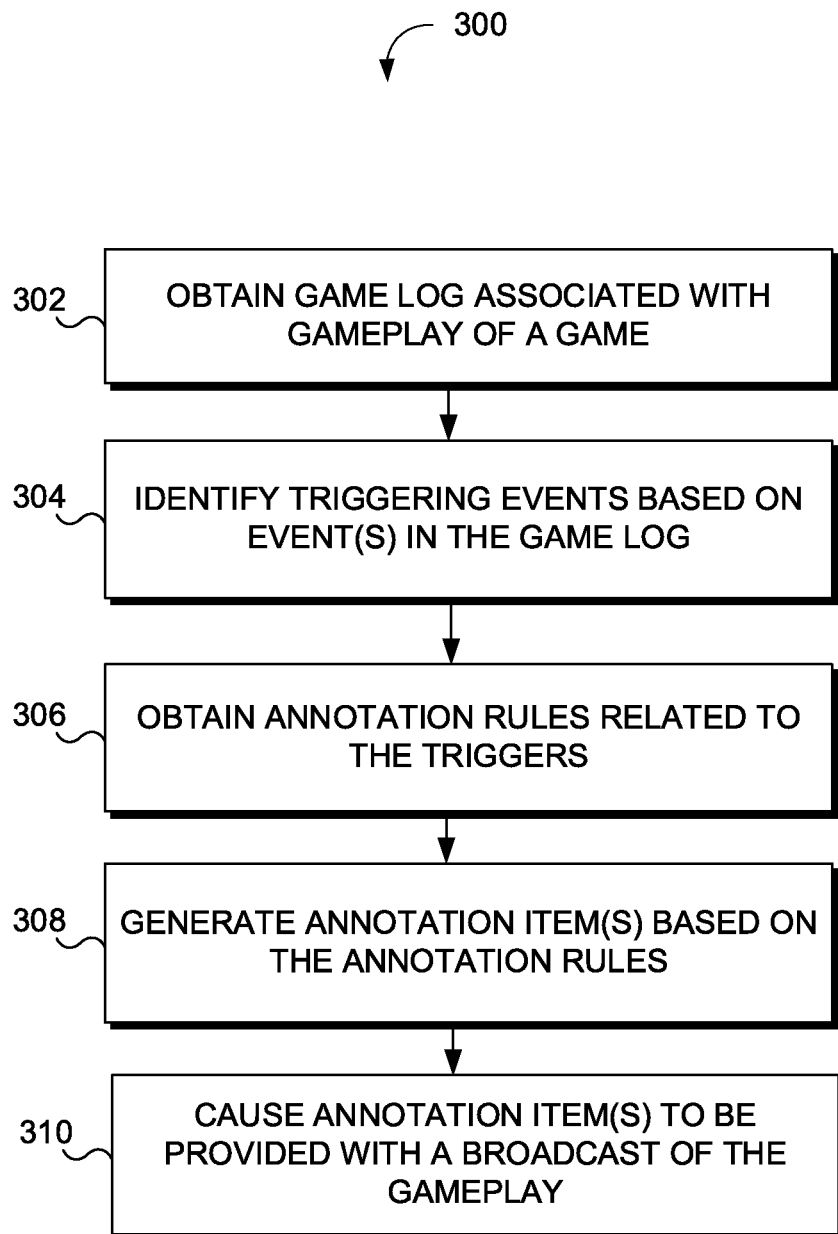
FIG. 3 depicts a process of automatically annotating gameplay of a video game based on triggering events, according to an implementation of the invention.

FIG. 3 depicts a process 300 of automatically annotating gameplay of a video game based on triggering events, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may include obtaining a game log. The game log may be obtained from a game engine substantially in real-time as gameplay is occurring (e.g., at least some of the game log is received while a corresponding gameplay session is occurring) or the game log may be pre-stored (e.g., after the gameplay session has completed). In some instances, process 300 may be performed by a game engine that generates a game log. In other instances, process 300 may be performed by a system component separate from the game engine, in which case the system component may obtain the game log directly or indirectly from the game engine.

In an operation 304, process 300 may include identifying a triggering event based on events in the game log. In an operation 306, process 300 may include obtaining one or more annotation rules associated with the triggering event. In an operation 308, process 300 may include generating one or more annotation items based on the one or more annotation rules. In some implementations, the one or more annotation items may be generated based further on feedback from viewers (e.g., users 107, 111 illustrated in FIG. 1). For example, as further described with respect to FIG. 4, a viewer may select or otherwise interact with an annotation item that has been generated. Such selection may indicate user interest in the annotation item. An indication of the selection may be obtained and stored (e.g., in a database 130) for later analysis.

For example, process 300 may determine that certain types of annotation items are of interest to viewers based on stored indications that certain annotation items have been selected by viewers. In a particular non-limiting example, process 300 may determine that K/D ratios are of particular interest to users. As such, process 300 may generate more annotation items relating to K/D ratios relative to other types of annotation items. In other instances, process 300 may determine that certain types of annotation items are not of interest to viewers based on stored indications that certain annotation items have been removed by viewers from an interface. In these instances, process 300 may recognize that certain types of annotation items should not be generated (or if they are generated, they should be ranked lower than other types of annotation items for implementations in which annotation items are ranked).

The foregoing feedback loop (whether positive or negative) of using user selections of annotation items to affect generation and/or display of future annotation items may be applied to all viewers generally, customized for a specific group of viewers (e.g., one demographic of viewers may have an interest in K/D ratios while another demographic of views may have an interest in Clutch Win percentages), customized for a particular viewer, etc.

In an operation 310, process 300 may include causing the one or more annotation items to be provided with a broadcast of the gameplay. The broadcast may include a live stream or a download.

Figure 4:
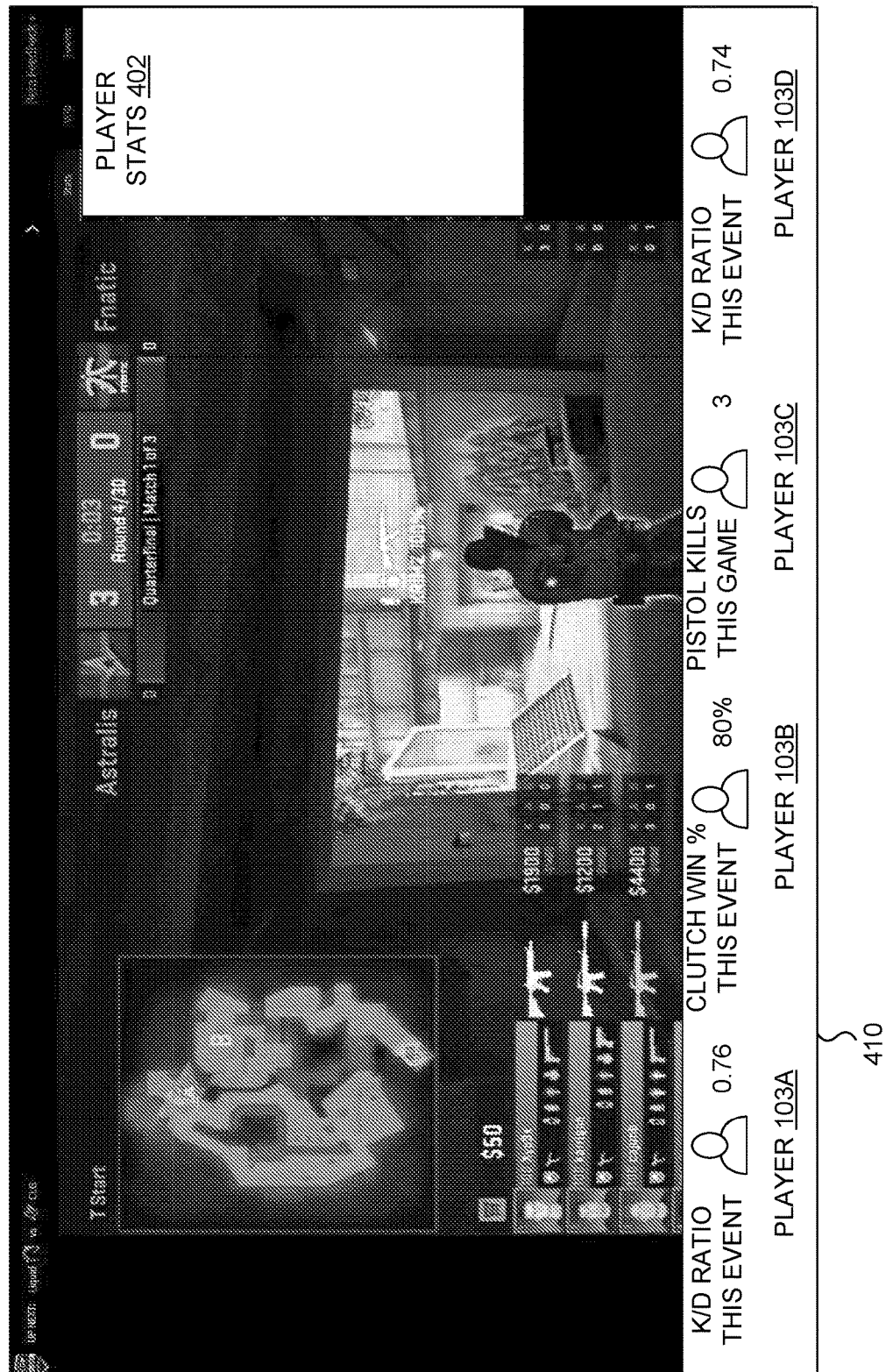
FIG. 4 depicts a screenshot of a broadcast of gameplay augmented with automatically generated annotations, according to an implementation of the invention.

FIG. 4 depicts a screenshot 400 of a broadcast of gameplay augmented with automatically generated annotations, according to an implementation of the invention. Various user interface components of screenshot 400 may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

As illustrated, screenshot 400 includes a main display area 404 that provides video of gameplay for a gameplay session (e.g., gameplay session 101 illustrated in FIG. 1). Main display area 404 may include a player statistics portion 402, which may list one or more players and their current game, event (e.g., tournament), historical, and/or other statistics relating to gameplay or the player. Annotation portion 410 may display annotation items. As illustrated, four annotation items for players 103A-D are displayed. Annotation portion 410 may be generated/updated as a set (e.g., all four annotation items are not generally individually swappable) or may be generated/updated individually (e.g., each annotation item may be individually generated and swapped out for another annotation item). In some instances, annotation portion 410 may be fixed, in which case only a maximum number of annotation items may be displayed at any given time. In other instances, annotation portion 410 may be scrolling, as in a ticker-style GUI object. In either case, the most recent or otherwise relevant set of annotation items may populate the annotation portion 410. Annotation portion 410 may be overlaid onto video of the gameplay, presented adjacent to the video of the gameplay, or may be presented on an altogether separate display (e.g., a display separately housed from the main display portion 404, which displays video of the gameplay).

Figure 5:
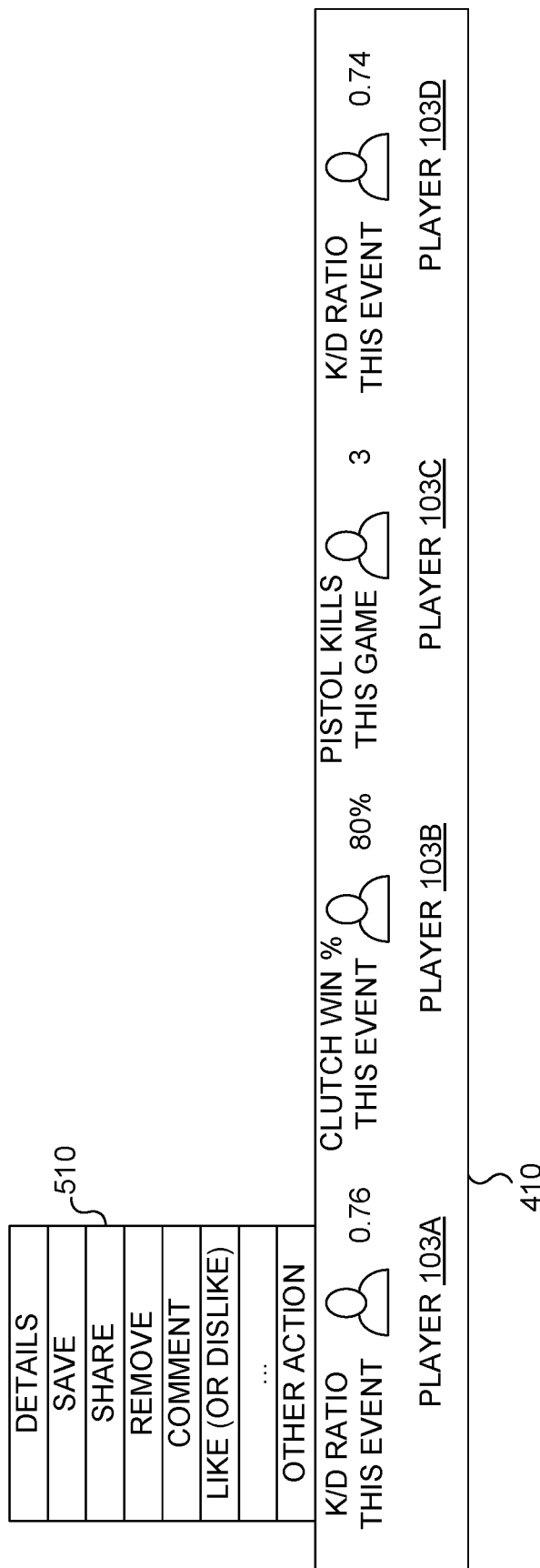
FIG. 5 depicts interactive, automatically generated, annotation items, according to an implementation of the invention.
Figure 6:
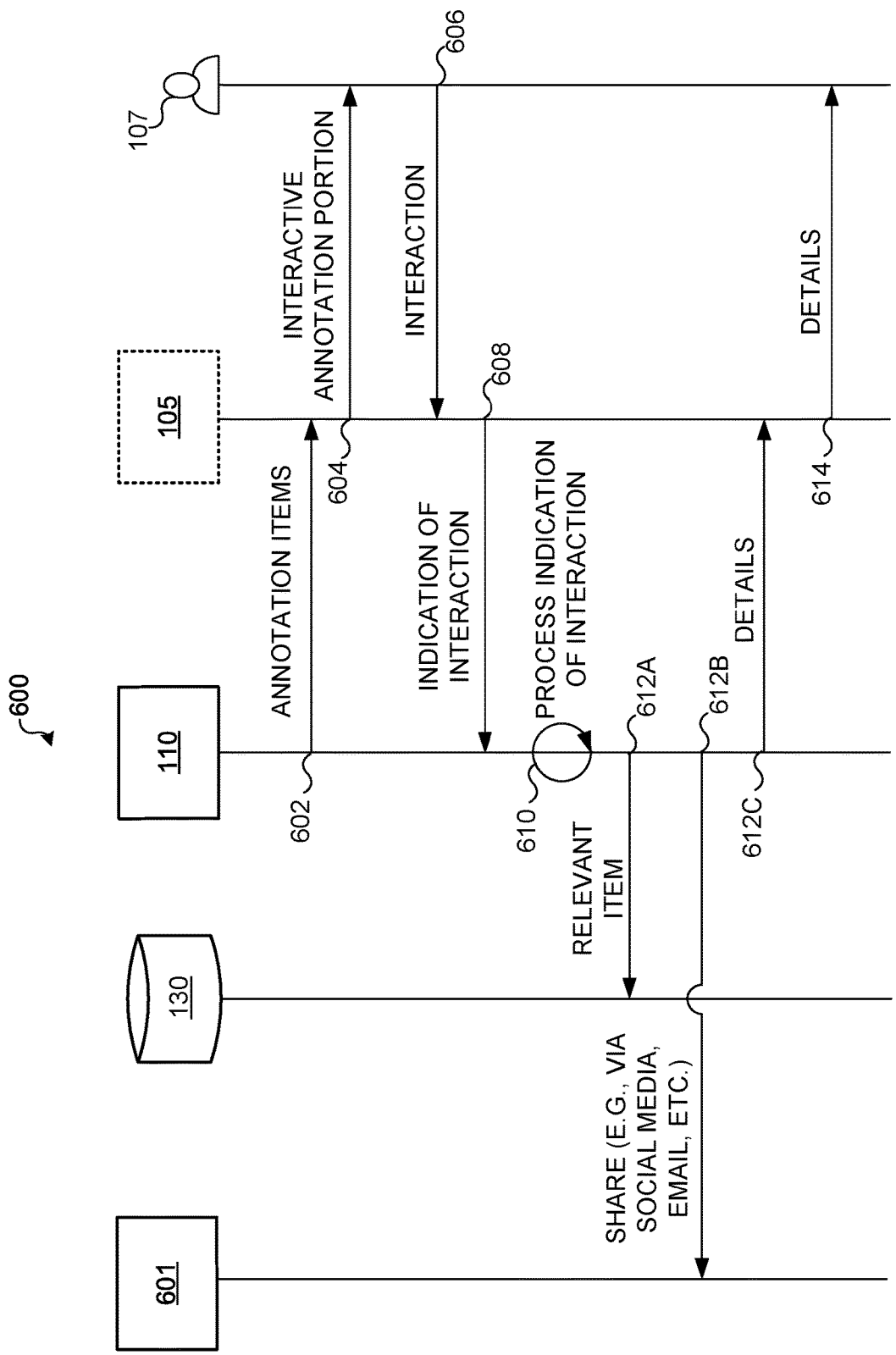
FIG. 6 depicts a process of displaying interactive, automatically generated, annotation items and processing interactions with the interactive annotation items, according to an implementation of the invention.

FIG. 5 depicts interactive, automatically generated, annotation items, according to an implementation of the invention. FIG. 6 depicts a process 600 of displaying interactive, automatically generated, annotation items and processing interactions with the interactive annotation items, according to an implementation of the invention. FIGS. 5 and 6 will be described with respect to one another for ease of illustration.

In an operation 602, computer system 110 may generate one or more annotation items, as described herein, and provide the annotation items for broadcast 105 (which may include a device configured to display a view of related gameplay and/or an interactive annotation portion 410). In some implementations, each annotation item may be associated with a unique identifier (hereinafter, an annotation item ID) so that it may be later referenced. Each annotation item ID may be stored (e.g., in a database 130) in association with a game log, a player, a timestamp at which the annotation item is relevant in a game log, and/or other information related to the annotation item.

In an operation 604, broadcast 105 may display an interactive annotation portion 410, which includes the annotation items. In some implementations, one or more components of annotation portion 410, including the displayed annotation items, may be interactive and capable of receiving input from a viewer of the broadcast to cause additional actions 510. For example, in an operation 606, a viewer may select (e.g., click, tap, or otherwise designate) an annotation item and broadcast 105 may receive such selection.

The selection may cause an action to be performed, such as access, and provide to the viewer, additional information (e.g., details) related to the annotation item (e.g., access an internet resource containing information relating to the annotation item or access additional information related to the annotation item stored in the annotation item); save the annotation item; transmit the annotation item (e.g., via social media, email, etc.); remove the annotation item from annotation portion 410 (in some instances, a replacement annotation item such as the next highest ranked annotation item may be added in place of the removed annotation item), comment on the selected annotation item, like (or dislike) the selected annotation item, and/or take other actions. In some implementations, the viewer may indicate a level of interest for a particular annotation item. The level of interest and/or other interactions may be fed back to game log annotator 120 and used in generating future annotation items.

In an operation 608, broadcast 105 may provide an indication of the interaction (e.g., the type of action called for by the interaction) to computer system 110. The indication may include an annotation item ID to which the interaction relates, an identification of a user who interacted with the annotation item, a timestamp in the game log at which the interaction was made, and/or other information. In an operation 610 computer system 110 may process the indication of the interaction, which may include storing the indication and relevant information (e.g., the type of action called for by the interaction, a user who requested the action, the annotation item ID, the timestamp at which the interaction occurred, any likes/dislikes provided by viewers, any comments provided by viewers, etc.). Computer system 110 may later retrieve the stored information to refine generation of annotation items.

In addition to the foregoing processing, computer system 110 may perform one or more operations 612 (612A, 612B, 612C, and/or other operations) depending on the type of action called for in the interaction. For example, responsive to an action to save an annotation item, in an operation 612A, computer system 110 may store the annotation item (more particularly, for example, the annotation item ID) in association with a user ID who requested such storage. In this manner, the user or others may obtain annotations items that the user has saved. Responsive to an action to share the annotation item, in an operation 612B, computer system 110 may share the annotation item via a requested communication channel (whether via electronic mail, social media site 601, etc.).

Responsive to an action to obtain additional information (e.g., details) about an annotation item, in an operation 612C, computer system 110 may obtain and provide the details to broadcast 105. The details may be obtained from a database, from the game log (e.g., to provide detailed information relating to events that culminated in the annotation item), from a player profile for a player to which the annotation item relates, a third party source, and/or source from which additional information relating to an annotation item may be obtained. In an operation 614, the details, if obtained, may be provided by broadcast 105 to user 107.

In some implementations, because the user interactions with a given annotation item may be stored (e.g., in a database 130), information relating to the interactions may be obtained by the system or others for analytics (e.g., to refine generation of annotation items as described herein), display, and/or other use. In implementations in which information relating to the interactions are displayed, the information may be displayed alongside an annotation item. For example, if a game log is replayed later (whether or not originally live-streamed), any automatically generated annotation items may be displayed as well in accordance with timestamps that synchronize the annotation items with the game log. Furthermore, the annotation items may be further augmented with the user interaction information, such as likes/dislikes, comments (including a thread of comments made), indications of the number of removals, saves, shares, etc.

Annotation items in annotation portion 410 may be swapped out or otherwise updated based on various display rules. Such rules may dictate when one or all annotation items should be swapped out for another annotation item (and/or expired and should be removed). For example, a display rule may specify that annotation items should be updated (but remain displayed) when one or more new annotation items are available to replace currently displayed annotation items. Another display rule may specify that annotation items should be expired upon passage of a predetermined period of time. Other rules may specify other conditions by which annotation items displayed at annotation portion 410 should be updated.

It should be noted that computer system 110 may provide broadcast 105 (or broadcast 109, which is not illustrated in FIG. 6). In other words, computer system 110 may provide a view of the game log and annotation items, either in an integrated display device and/or to a display device that is connected to computer system 110. Thus, computer system 110 and broadcast 105 are illustrated as being separate for illustrative purposes.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of providing an interactive annotation item, which is generated based on at least one triggering event during gameplay, and performing at least one action responsive to a user interaction with the interactive annotation item, the method being implemented in a computer system having one or more physical processors programmed with computer program instructions that, when executed by the one or more physical processors, cause the computer system to perform the method, the method comprising:

obtaining, by the computer system, the interactive annotation item that is generated based on the at least one triggering event during the gameplay;

generating, by the computer system, a user interface comprising a display portion that includes video of the gameplay and an annotation portion that includes the interactive annotation item;

receiving, by the computer system, an indication that the interactive annotation item was interacted with via the user interface;

determining, by the computer system, an action to be taken based on the indication; and causing, by the computer system, the action to be taken.

2. The method of claim 1, wherein determining the action to be taken comprises:

determining, by the computer system, that the interactive annotation item should be shared, and wherein causing the action to be taken comprises sharing, by the computer system, the interactive annotation item.

3. The method of claim 2, wherein sharing the interactive annotation item comprises:

causing, by the computer system, the interactive annotation item to be posted to a social media site.

4. The method of claim 2, wherein sharing the interactive annotation item comprises:

causing, by the computer system, the interactive annotation item to be transmitted via electronic mail.

5. The method of claim 1, wherein determining the action to be taken comprises:

determining, by the computer system, that the interactive annotation item should be stored in association with a user identification, and wherein causing the action to be taken comprises causing, by the computer system, the interactive annotation item to be stored in association with the user identification.

6. The method of claim 1, wherein determining the action to be taken comprises:

determining, by the computer system, that additional information relating to the interactive annotation item should be obtained and provided, and wherein causing the action to be taken comprises obtaining, by the computer system, the additional information and providing the additional information via the user interface.

7. The method of claim 1, wherein determining the action to be taken comprises:

determining, by the computer system, that the interactive annotation item should be removed from the annotation portion, and wherein causing the action to be taken comprises removing, by the computer system, the interactive annotation item from the annotation portion.

8. The method of claim 7, the method further comprising:

replacing, by the computer system, the removed interactive annotation item with a different annotation item.

9. The method of claim 1, the method further comprising:

obtaining, by the computer system, at least a portion of a game log for a gameplay session during which the gameplay occurs;

identifying, by the computer system, the at least one triggering event based on the game log;

generating, by the computer system, the interactive annotation item based on the at least one triggering event.

10. The method of claim 9, the method further comprising:

storing, by the computer system, the indication that the interactive annotation item was interacted with along with a previous indication that a previous interactive annotation item was interacted with, wherein generating the interactive annotation item is based further on the previous indication that the previous interactive annotation item was interacted with, indicating that a given user was interested in the previous interactive annotation item.

11. A system of providing an interactive annotation item, which is generated based on at least one triggering event during gameplay, and performing at least one action responsive to a user interaction with the interactive annotation item, the system comprising:

a computer system comprising one or more physical processors programmed with computer program instructions that, when executed by the one or more physical processors, program the computer system to:

obtain the interactive annotation item that is generated based on the at least one triggering event during the gameplay;

generate a user interface comprising a display portion that includes video of the gameplay and an annotation portion that includes the interactive annotation item;

receive an indication that the interactive annotation item was interacted with via the user interface;

determine an action to be taken based on the indication; and cause the action to be taken.

12. The system of claim 11, wherein to determine the action to be taken, the computer system is programmed to:

determine that the interactive annotation item should be shared, and wherein to cause the action to be taken, the computer system is programmed to share the interactive annotation item.

13. The system of claim 12, wherein to share the interactive annotation item, the computer system is programmed to:

cause the interactive annotation item to be posted to a social media site.

14. The system of claim 12, wherein to share the interactive annotation item, the computer system is programmed to:

cause the interactive annotation item to be transmitted via electronic mail.

15. The system of claim 11, wherein to determine the action to be taken, the computer system is programmed to:

determine that the interactive annotation item should be stored in association with a user identification, and wherein to cause the action to be taken, the computer system is programmed to cause the interactive annotation item to be stored in association with the user identification.

16. The system of claim 11, wherein to determine the action to be taken, the computer system is programmed to:

determine that additional information relating to the interactive annotation item should be obtained and provided, and wherein to cause the action to be taken, the computer system is programmed to obtain the additional information and providing the additional information via the user interface.

17. The system of claim 11, wherein to determine the action to be taken, the computer system is programmed to:

determine that the interactive annotation item should be removed from the annotation portion, and wherein to cause the action to be taken, the computer system is programmed to remove the interactive annotation item from the annotation portion.

18. The system of claim 17, wherein the computer system is programmed to:
  replace the removed interactive annotation item with a different annotation item.

19. The system of claim 11, wherein the computer system is programmed to:
  obtain at least a portion of a game log for a gameplay session during which the gameplay occurs;
  identify the at least one triggering event based on the game log;
  generate the interactive annotation item based on the at least one triggering event.

20. The system of claim 19, wherein the computer system is programmed to:
  store the indication that the interactive annotation item was interacted with along with a previous indication that a previous annotation item was interacted with, wherein the interactive annotation item is generated based further on the previous indication that the previous annotation item was interacted with, indicating that a given user was interested in the previous annotation item.

21. A non-transient computer readable medium comprising a plurality of programmatic instructions that, when executed, provide an interactive annotation item, which is generated based on at least one triggering event during gameplay, and cause performance of an action responsive to a user interaction with the interactive annotation item, by:
  obtaining the interactive annotation item that is generated based on the at least one triggering event during the gameplay;
  generating a user interface comprising a display portion that includes video of the gameplay and an annotation portion that includes the interactive annotation item;
  receiving an indication that the interactive annotation item was interacted with via the user interface;
  determining an action to be taken based on the indication; and
  causing the action to be taken.

22. The non-transient computer readable medium of claim 21 further comprising programmatic instructions that, when executed, determine that the interactive annotation item should be shared and cause a sharing of the interactive annotation item.

23. The non-transient computer readable medium of claim 22, further comprising programmatic instructions that, when executed, share the interactive annotation item by posting the interactive annotation item to a social media site.

24. The non-transient computer readable medium of claim 22, further comprising programmatic instructions that, when executed, share the interactive annotation item by transmitting the interactive annotation item via electronic mail.

25. The non-transient computer readable medium of claim 21, further comprising programmatic instructions that, when executed, determine that the interactive annotation item should be stored in association with a user identification and cause the interactive annotation item to be stored in association with the user identification.

26. The non-transient computer readable medium of claim 21, further comprising programmatic instructions that, when executed, determine that additional information relating to the interactive annotation item should be obtained and provide the additional information via the user interface.

27. The non-transient computer readable medium of claim 21, further comprising programmatic instructions that, when executed, determine that the interactive annotation item should be removed from the annotation portion and cause a removal of the interactive annotation item from the annotation portion.

28. The non-transient computer readable medium of claim 27, further comprising programmatic instructions that, when executed, cause a replacement of the removed interactive annotation item with a different annotation item.

29. The non-transient computer readable medium of claim 21, further comprising programmatic instructions that, when executed, obtain at least a portion of a game log for a gameplay session during which the gameplay occurs, identify the at least one triggering event based on the game log, and generate the interactive annotation item based on the triggering event.

30. The non-transient computer readable medium of claim 29, further comprising programmatic instructions that, when executed, store the indication that the interactive annotation item was interacted with along with a previous indication that a previous annotation item was interacted with, wherein the interactive annotation item is generated based further on the previous indication that the previous annotation item was interacted with, indicating that a given user was interested in the previous annotation item.

* * * * *